No. 689,146. Patented Dec. 17, 1901.
U. J. VAN BERGEN.
PACKING DEVICE FOR SHAFT BEARINGS.
(Application filed May 23, 1901.)
(No Model.)
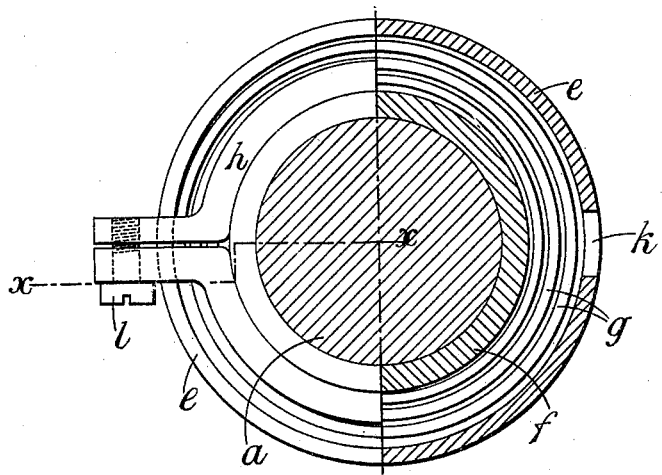
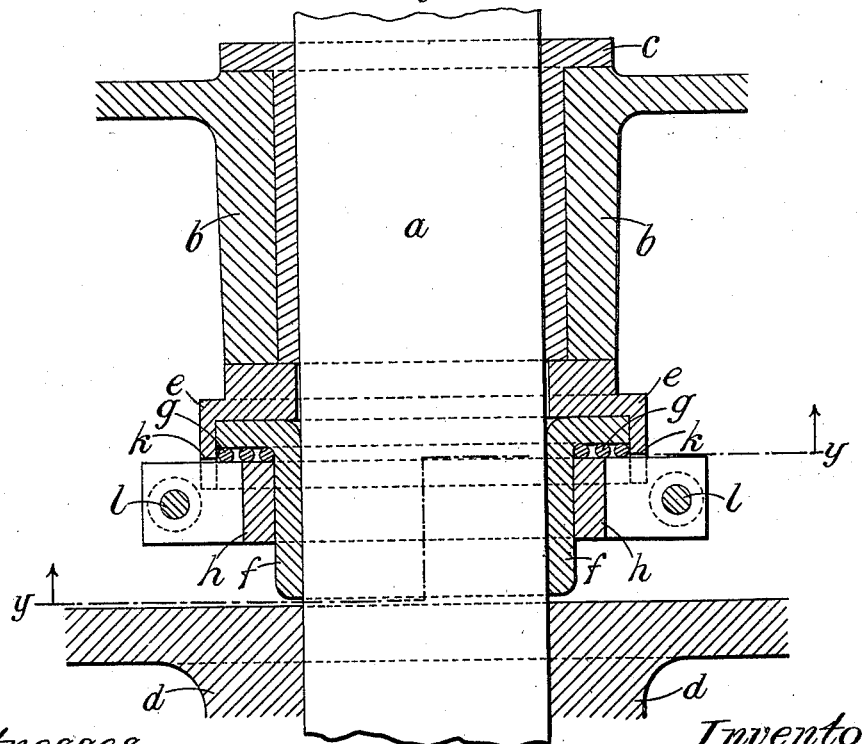

UNITED STATES PATENT OFFICE.

UDO JURRIEN VAN BERGEN, OF SCHEEMDA, NETHERLANDS.

PACKING DEVICE FOR SHAFT-BEARINGS.

SPECIFICATION forming part of Letters Patent No. 689,146, dated December 17, 1901.

Application filed May 23, 1901. Serial No. 61,658. (No model.)

*To all whom it may concern:*

Be it known that I, UDO JURRIEN VAN BERGEN, a subject of the Queen of the Netherlands, residing at 33 Heiligerlee, Commune of Scheemda, in the Kingdom of the Netherlands, have invented a certain new and useful Improved Packing Device for Shaft-Bearings, of which the following is a specification.

This invention relates to an arrangement for use in explosion-motors, more particularly in the "Wolverine" two-stroke-cycle and like motors, wherein the casing in which the crank moves is at the same time arranged as a chamber into which the explosive mixture is drawn and in which it is compressed. In motors of this kind it is of great importance that the above-mentioned suction-chamber shall be closed air-tight. In the motors as heretofore constructed it has not been possible to keep permanently tight the place at which the crank-shaft passes out of the casing. The success of these motors is thus interfered with, the output gradually decreases, since the mixture of gas and air is not the most advantageous one, and eventually the motor can no longer be made to work.

My invention is designed to produce an arrangement which prevents leaking of the casing at the bearings without, however, increasing the internal friction of the motor.

My improved packing is shown, by way of example, in the accompanying drawings, in which—

Figure 1 is a sectional elevation on the line $y$ $y$, Fig. 2; and Fig. 2 is a section on the line $x$ $x$, Fig. 1, showing the bearing of a motor fitted with my improvement.

The shaft $a$ of the motor turns in a bearing $b$, cast on the crank-casing, which is provided with a metal bush $c$. The said shaft $a$ bears the fly-wheel $d$ at its end, and between the bearing $b$ and the fly-wheel $d$ is arranged the packing device which forms the subject of my invention. The outside of the bearing is turned smooth, and a flanged collar or wheel $e$ is ground or suitably prepared to fit thereto. This collar $e$ is of the cross-section shown in Fig. 2 and moves with the shaft $a$. To make the joint, a flanged leather washer $f$ is provided, which is pressed into the collar $e$ by a spiral spring $g$ and is clamped tightly around the shaft $a$ by means of a strap $h$. This strap $h$ is made in two parts and lies in recesses $k$, formed in the periphery of the flange on the collar $e$, and in this manner drives the said collar.

The improved packing device is arranged so that the collar $e$ rests closely against the bearing $b$ and is pressed against the said bearing by the spring $g$. In order to tension the spring $g$, the strap $h$ is pushed forward and is clamped tightly onto the shaft $a$, with the washer $f$ in between, by means of screws $l$. It will thus be seen that an air-tight connection is made at three places—viz., between the bearing $b$ and the collar $e$, between the leather washer $f$ and the collar $e$, and between the leather washer $f$ and the shaft $a$. The entrance of air during the drawing in of the mixture and the escape of the mixture during compression are thus entirely precluded. If in the course of time a small space forms between the collar $e$ and the bearing $b$, it is only necessary to slacken the screws $l$, to push all the parts forward slightly, and then make the connection again.

What I claim is—

1. In combination, a wall or casing, a bearing extending through said wall or casing, a shaft mounted in said bearing, a collar mounted on said shaft and fitted to an end of said bearing, a flanged washer of flexible material on said shaft, a strap secured around said washer and engaging said collar, and a spring arranged between said strap and the flange on said washer, substantially as, and for the purpose, hereinbefore described.

2. In combination, a wall or casing, a bearing extending through said wall or casing, a shaft mounted in said bearing, a flanged collar mounted on said shaft and fitted to an end of said bearing, recesses in the flange on said collar, a flanged washer on said shaft, a divided strap secured around said washer and engaging the recesses in the flange on said collar, tightening-screws for said strap, and a spring arranged between said strap and the flange on said washer, substantially as, and for the purpose, specified.

3. In combination, a wall or casing, a bearing extending through said wall or casing, a shaft mounted in said bearing, a flanged collar mounted on said shaft and fitted to an end of said bearing, recesses in the flange on said collar, a flanged washer on said shaft, a divided strap secured around said washer, lugs on said strap engaging said recesses, tightening-screws in the lugs of said strap, and a spiral spring arranged between said strap and the flange on said washer, substantially as, and for the purpose, hereinbefore described.

In testimony whereof I have hereunto set my hand in presence of two subscribing witnesses.

UDO JURRIEN VAN BERGEN.

Witnesses:
THOMAS HERMANUS VERHAVE,
JOHANNES D. FÜHRINS.